No. 769,591. PATENTED SEPT. 6, 1904.
J. A. DANSEREAU.
FRUIT GATHERER.
APPLICATION FILED FEB. 1, 1904.
NO MODEL.
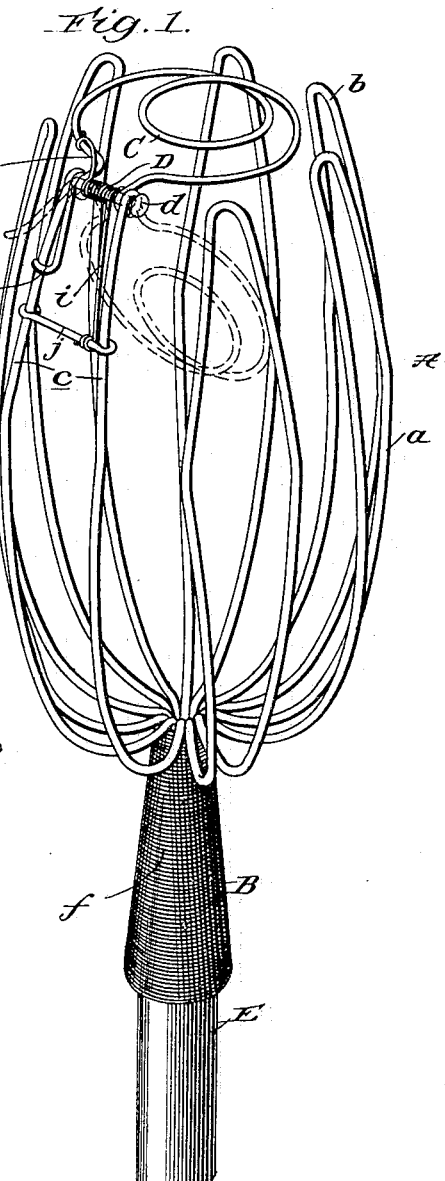
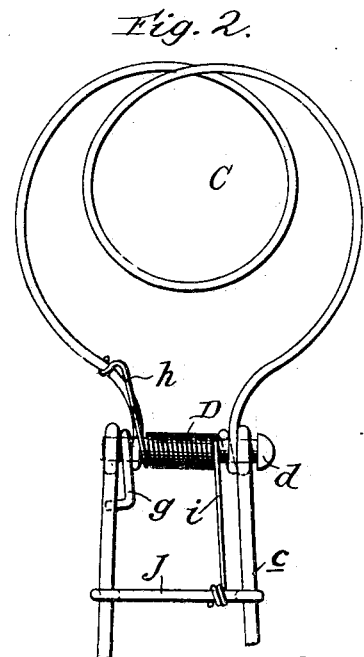
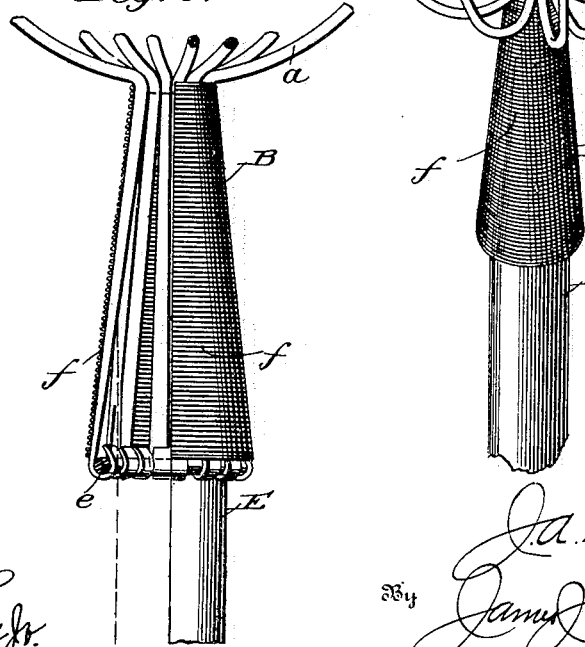

No. 769,591. Patented September 6, 1904.

UNITED STATES PATENT OFFICE.

JOSEPH A. DANSEREAU, OF WOONSOCKET, RHODE ISLAND, ASSIGNOR OF ONE-THIRD TO NORBERT P. LEFRANCOIS, OF WOONSOCKET, RHODE ISLAND.

FRUIT-GATHERER.

SPECIFICATION forming part of Letters Patent No. 769,591, dated September 6, 1904.

Application filed February 1, 1904. Serial No. 191,577. (No model.)

*To all whom it may concern:*

Be it known that I, JOSEPH A. DANSEREAU, a citizen of the United States, residing at Woonsocket, in the county of Providence and State of Rhode Island, have invented new and useful Improvements in Fruit-Gatherers, of which the following is a specification.

My invention pertains to fruit-gatherers of the basket type; and it has for its object to provide such a gatherer constructed with a view of preventing the casual discharge of gathered fruit from the basket incident to the manipulation of the basket among the limbs of a tree, and when the same is lowered to the ground for the purpose of transferring its contents to a receptacle.

Other advantageous features of the invention will be fully understood from the following description and claims when taken in connection with the accompanying drawings, forming part of this specification, in which—

Figure 1 is a perspective view of my novel fruit-gatherer, the flap of the same being shown by full lines in its normal position and by dotted lines in the position which it assumes to permit fruit to drop into the basket. Fig. 2 is an enlarged detail view illustrating the flap and the portion of the basket to which the same is connected, the flap being shown as open. Fig. 3 is a detail view, on an enlarged scale and partly in elevation and partly in vertical section, illustrating the manner in which I prefer to construct the handle-socket of the basket.

Similar letters designate corresponding parts in all of the views of the drawings, referring to which—

A is the basket of the fruit-gatherer constituting the present and preferred embodiment of my invention. The said basket is formed of a circular series of upright loops $a$, which are slightly bowed outwardly, as best shown in Fig. 1, and have the bights $b$ at their upper ends disposed in the same horizontal plane. The basket also comprises two upright wires $c$, which are arranged between two of the loops $a$ with their upper ends flush with the bights of the loops and connected by a bolt or shaft $d$. The wires $c$, like the loops $a$, are preferably bowed slightly outward, and all are possessed of resiliency, so as to enable them to give when they come in contact with the limb of a tree and readily pass the same. The lower ends of the loops $a$ and the wires $c$ are shaped to form a circular socket B and are bent around a ring $e$ and wrapped with comparatively fine wire $f$, as best shown in Fig. 3. This wire $f$ may extend throughout the length of the socket, as illustrated, or may terminate at a point considerably above the ring $e$, as desired.

C is the flap of the gatherer. This flap is preferably formed of wire of a smaller caliber than that of which the loops $a$ of the basket are formed and is preferably arranged so as to normally rest flush with the bights $b$ of the loops $a$ and the upper ends of the wires $c$. Said flap is of a size to close the mouth of the basket and is provided with a combined stop and finger-piece $g$, which normally bears at its lower end against the outer side of one of the wires $c$, as clearly shown in Fig. 1.

D is a spring which is coiled about the shaft or bolt $d$ and has an arm $h$, connected to the flap C, and an arm $i$, connected to a cross-bar $j$, extending between the wires $c$. The said spring has for its purpose to normally hold the flap in a closed position and to return the flap to such position subsequent to the depression of the same by falling fruit, also to open and hold the flap open, Fig. 2.

All the operator has to do to open the mouth of the basket for the discharge of fruit therefrom is to press the finger-piece $g$ toward the right and out of engagement with the wire $c$, so as to allow said finger-piece to swing into the basket, thereby releasing the spring, which will throw the flap into the open position (shown in Fig. 2) and hold it in such position. This obviates the necessity of the operator holding the flap away from the mouth of the basket during the discharge of the gatherer.

In the practical use of my novel gatherer a handle E, of suitable length, is placed in the socket B of the basket, and the basket is moved up and down among the limbs of a fruit-bearing tree. When the basket is thus manipulated, the stem of a piece of fruit passes down between the loops $a$ and the weight of the fruit overcomes the tension of the spring D, when by twisting or turning the basket on its axis the stem will be broken and the fruit received in the basket. Immediately subsequent to the dropping of the fruit from the tree into the basket the flap C will spring back into its closed position, and by so doing will preclude the casual discharge of gathered fruit from the basket incident to the manipulation of the same in the tree. This will be appreciated as an important advantage when it is remembered that in using a fruit-gatherer it is frequently necessary to incline the same to a greater or less extent, and when the mouth of the basket is open there is great liability of fruit falling from the basket when the same is inclined as stated. The flap C also serves when the basket is full of gathered fruit and is lowered to the ground to preclude the casual discharge of the fruit when the gatherer is brought into a horizontal or approximately-horizontal position. This obviates the necessity of the operator closing the mouth of the basket with his hand until he is ready for the fruit to pass into a receptacle placed to receive it. The flap C is further advantageous, since when the stem of an apple or other piece of fruit is too tough to be broken by twisting it between loops $a$ of the basket the piece of fruit may be readily pulled from the tree. To accomplish this, the basket is moved upwardly below the piece of fruit, so as to cause the piece of fruit to move downwardly and assume a position in the basket below the flap C, which will return to its closed position after the passage of the fruit. The gatherer is then moved downwardly, when the flap will operate to pull the fruit from the tree and the fruit will be received in the basket.

While I prefer to form the basket of my novel fruit-gatherer of loops and pieces of wire in the manner described, I desire it distinctly understood that the basket may be made up of staves of any other suitable description without involving departure from the scope of my invention. I also desire it understood that the flap C and the socket B of the basket may be of any suitable construction and may be formed of any approved material without departing from my invention, as claimed.

I prefer to form the basket A, the socket B thereof, and the flap C in the manner described in detail, since when so formed the parts are sturdy and strong in construction, and therefore well adapted to withstand the rough usage to which fruit-gatherers are ordinarily subjected.

Notwithstanding the practical advantages possessed by my novel gatherer, it will be noticed that the same is simple and inexpensive in construction and may therefore be produced and sold with profit for a small price.

Having described my invention, what I claim and desire to secure by Letters Patent, is—

1. In a fruit-gatherer, the combination of a basket open at its upper end, and a spring-pressed flap connected to the basket and normally resting in a horizontal position so as to close the upper end thereof; the said flap being arranged to open downwardly under the weight of a piece of fruit, and to automatically resume its closed position subsequent to the fall of the fruit into the basket.

2. The combination in a fruit-gatherer, of a basket open at its upper end, and formed of a series of wire loops and uprights arranged between two of the loops, and connected together at their upper ends, a flap of wire, pivotally connected to the connection between the said uprights of the basket, and having a combined stop and finger-piece normally bearing against one of the uprights, and a spring coiled about the said connection, and having an arm connected to the basket, and also having an arm connected to the flap, whereby the latter is normally held in and returned to a horizontal position.

3. The combination in a fruit-gatherer, of a basket formed of staves and open at its upper end, and a spring-pressed flap pivotally connected to the basket, and normally resting in a horizontal position, and flush with the upper ends of the staves of the basket so as to close the upper end of the latter.

4. The combination in a fruit-gatherer, of a basket open at its upper end, and formed of a series of wire loops and uprights arranged between two of the loops and connected together at their upper ends; the said loops and uprights being connected at their lower ends to a ring and being wrapped with wire so as to form a handle-socket, a flap of wire, pivotally connected to the connection between the said uprights of the basket, so as to normally rest flush with the bights of the wire loops, and having a combined stop and finger-piece normally bearing against one of the uprights, and a spring coiled about the said connection and having arms connected to one of the uprights and the flap, respectively, whereby the flap is normally held in and returned to a horizontal position.

5. The combination in a fruit-gatherer, of a basket open at its upper end, and a spring-pressed flap connected to the basket and normally resting in a horizontal position so as to close the upper end thereof; the said flap being arranged to open downwardly under the weight of a piece of fruit and to automatically resume its closed position subsequent to the fall of the fruit into the basket, and being provided with a finger-piece arranged to normally engage the basket and hold it against upward movement under the action of the spring.

In testimony whereof I have hereunto set my hand in presence of two subscribing witnesses.

JOSEPH A. DANSEREAU.

Witnesses:
 EDGAR L. SPAULDING,
 GEO. W. SPAULDING.